United States Patent
Wu et al.

(10) Patent No.: US 12,360,507 B2
(45) Date of Patent: Jul. 15, 2025

(54) SENSING DATA ACCESSING METHOD AND SENSING DATA ACCESSING SYSTEM

(71) Applicant: ASUSTeK COMPUTER INC., Taipei (TW)

(72) Inventors: Shin-Fu Wu, Taipei (TW); Hao-Yu Chen, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 349 days.

(21) Appl. No.: 17/968,805

(22) Filed: Oct. 19, 2022

(65) Prior Publication Data
US 2023/0350371 A1 Nov. 2, 2023

(30) Foreign Application Priority Data

Apr. 29, 2022 (TW) ................... 111116366

(51) Int. Cl.
*G05B 19/042* (2006.01)
*G05B 9/02* (2006.01)

(52) U.S. Cl.
CPC .......... *G05B 19/0423* (2013.01); *G05B 9/02* (2013.01)

(58) Field of Classification Search
CPC ........ G05B 19/0423; G05B 9/02; G05B 9/00; G05B 11/00; G05B 19/00; G05B 2219/00
See application file for complete search history.

(56) References Cited

U.S. PATENT DOCUMENTS

| | | | |
|---|---|---|---|
| 10,108,462 B2 | 10/2018 | Choe et al. | |
| 2011/0215952 A1* | 9/2011 | Aria | G06F 3/017 341/20 |
| 2013/0304996 A1* | 11/2013 | Venkataraman | G06F 11/0715 711/150 |
| 2015/0095588 A1 | 4/2015 | Abdallah | |
| 2018/0357190 A1* | 12/2018 | Han | G09B 29/106 |
| 2020/0213811 A1* | 7/2020 | Scott | H04W 4/027 |

FOREIGN PATENT DOCUMENTS

| | | |
|---|---|---|
| CN | 105955239 | 8/2018 |
| CN | 108701058 | 10/2018 |
| CN | 106155667 | 7/2019 |
| CN | 112099967 | 12/2020 |
| CN | 113987046 | 1/2022 |
| TW | 201741870 | 12/2017 |

OTHER PUBLICATIONS

"Office Action of Taiwan Counterpart Application", issued on Nov. 4, 2022, p. 1-p. 8.

* cited by examiner

*Primary Examiner* — Kidest Bahta
(74) *Attorney, Agent, or Firm* — JCIPRNET

(57) ABSTRACT

A sensing data accessing method and a sensing data accessing system are disclosed. The method includes: activating a shared memory; generating sensing data by a sensor; storing first sensing data among the sensing data to the shared memory and updating an operation state of the shared memory through a sensor interface; in response to an update of the operation state, reading the first sensing data from the shared memory through a software interface; and performing a default operation according to the first sensing data.

12 Claims, 4 Drawing Sheets

SENSING DATA ACCESSING METHOD AND SENSING DATA ACCESSING SYSTEM

CROSS-REFERENCE TO RELATED APPLICATION

This application claims the priority benefit of Taiwan application serial no. 111116366, filed on Apr. 29, 2022. The entirety of the above-mentioned patent application is hereby incorporated by reference herein and made a part of this specification.

BACKGROUND

Technical Field

The disclosure relates to a sensing data accessing method and a sensing data accessing system.

Description of Related Art

Various electronic devices such as smart phones or tablet computers are generally equipped with one or more sensors to provide functions such as motion sensing of the device. Sensors provided by different manufacturers often adopt different communication interfaces or data formats. Therefore, when changing the sensor supplier, the accessing program originally developed for the sensor provided by the previous manufacturer (including the front-end application programming interface and the back-end processing program) often needs to be completely redesigned, resulting in additional development costs and/or extended product development cycles. In addition, once the redesigned accessing program has defects, the stability of the product is easily degraded.

SUMMARY

According to the first aspect of this disclosure, a sensing data accessing method is provided. The sensing data accessing method includes the following steps: activating a shared memory; generating sensing data by a sensor; storing a first sensing data among the sensing data to the shared memory and updating an operation state of the shared memory through a sensor interface; in response to an update of the operation state, reading the first sensing data from the shared memory through a software interface; and performing a default operation according to the first sensing data.

According to the second aspect of this disclosure, a sensing data accessing system. The sensing data accessing system includes a shared memory, a sensor, and a processor. The sensor is used for generating sensing data. The processor is coupled to the shared memory and the sensor. The processor is used for the following operation. The shared memory is activated. A first sensing data among the sensing data is stored to the shared memory and an operation state of the shared memory is updated through a sensor interface. In response to an update of the operation state, the first sensing data is read from the shared memory through a software interface. A default operation is performed according to the first sensing data.

Based on the above, after the shared memory is activated, the sensor interface may be used for storing the first sensing data generated by the sensor in the shared memory and the operation state of the shared memory is updated. In response to the update of the operation state, a software interface may be used for reading the first sensing data from the shared memory and perform a default operation according to the first sensing data. Therefore, through the coordinated operation of a customized sensor interface, a unified software interface, and the shared memory, the product development efficiency and/or product stability of the electronic device configured with various sensors may be effectively improved.

DETAILED DESCRIPTION OF DISCLOSED EMBODIMENTS

Figure 1:
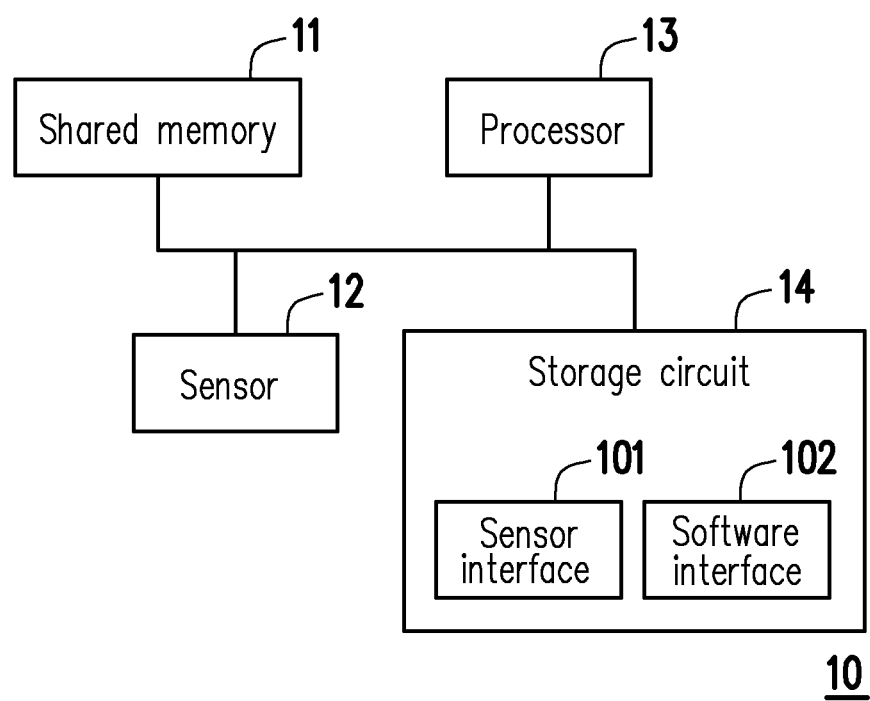
FIG. 1 is a schematic diagram of an electronic device according to an embodiment of the disclosure.

Referring to FIG. 1, a sensing data accessing system 10 may be configured in various types of electronic devices such as a smart phone, a tablet computer, a notebook computer, a desktop computer, a gaming console, a server, an industrial computer, a Kiosk, or an in-vehicle computer, and the types of electronic devices are not limited thereto.

The sensing data accessing system 10 includes a shared memory 11, a sensor 12, a processor 13, and a storage circuit 14. The shared memory 11, the sensor 12, the processor 13, and the storage circuit 14 may be electrically connected to the circuit board of the electronic device.

The shared memory 11 is used for temporarily storing data. In one embodiment, the shared memory 11 may include a volatile memory module such as random access memory (RAM). In one embodiment, the shared memory 11 may also include non-volatile memory such as flash memory. In addition, the total number of the shared memory 11 may be one or more.

The sensor 12 may be used for sensing environmental states and generate sensing data. The sensing data may reflect the sensing result of the sensor 12 on the environmental state. In one embodiment, the sensor 12 includes various types of sensors such as a gyroscope, a g-sensor, an accelerometer, and a magnetic sensor that may be used for sensing the moving state (e.g., the tilting state) of the electronic device in the physical space. The generated sensing data may reflect the moving state of the electronic device in the physical space. In one embodiment, the sensor 12 may also include other types of sensors, such as a light sensor or a proximity sensor, which is not limited in the disclosure. Furthermore, the total number of the sensor 12 may be one or more.

The processor 13 is coupled to the shared memory 11, the sensor 12, and the storage circuit 14. The processor 13 may be responsible for the overall or partial operation of the sensing data accessing system 10. For example, the processor 13 may include a central processing unit (CPU), or other programmable general-purpose or special-purpose microprocessor, a digital signal processor (DSP), a programmable controller, an application specific integrated circuit (ASIC), a programmable logic device (PLD), or other similar devices, or a combination of these devices.

The storage circuit 14 is used for storing data. For example, the storage circuit 14 may include a non-volatile storage circuit. For example, the non-volatile storage circuit may include read only memory (ROM), flash memory, conventional hard disk drive (HDD), or similar non-volatile storage media.

In one embodiment, the storage circuit 14 stores a sensor interface 101 and a software interface 102. The processor 13 may operate the sensor interface 101 and the software interface 102. It should be noted that the sensor interface 101 includes an application programming interface (API) suitable for communicating with the sensor 12. In addition, both the sensor interface 101 and the software interface 102 include program code and/or firmware code used for accessing the shared memory 11.

In one embodiment, the processor 13 may activate the shared memory 11. For example, the processor 13 may enable or configure the shared memory 11 so that the shared memory 11 is in an accessible state. The processor 13 may obtain sensing data (also referred to as the first sensing data) from the sensor 12 through the sensor interface 101 and store the first sensing data in the shared memory 11. Next, the processor 13 may update the operation state of the shared memory 11. In response to the update of the operation state, the processor 13 may read the first sensing data from the shared memory 11 through the software interface 102. Thereafter, the processor 13 may perform a default operation according to the first sensing data.

In one embodiment, the processor 13 may detect the operation state of the shared memory 11 through the sensor interface 101. In response to the operation state of the shared memory 11 being a specific state (also referred to as the first state), the processor 13 may store the first sensing data generated by the sensor 12 in the shared memory 11 through the sensor interface 101. After storing the first sensing data in the shared memory 11, the processor 13 may update the operation state of the shared memory 11 to another state (also referred to as the second state) through the sensor interface 101 to allow the software interface 102 to read the first sensing data from the shared memory 11.

In one embodiment, the processor 13 may detect the operation state of the shared memory 11 through the software interface 102. In response to the operation state of the shared memory 11 being the second state, the processor 13 may read the first sensing data from the shared memory 11 through the software interface 102. After reading the first sensing data from the shared memory 11, the processor 13 may restore the operation state of the shared memory 11 to the first state through the software interface 102 to allow the sensor interface 101 to store the new sensing data (also referred to as the second sensing data) generated by the sensor 12 in the shared memory 11.

In one embodiment, in the first state, the shared memory 11 may be configured to be in a state in which sensing data generated by the sensor 12 may be stored in the shared memory 11. Therefore, in one embodiment, the first state is also referred to as a writable state. In one embodiment, the sensing data generated by the sensor 12 may be stored in the shared memory 11 only in the first state (i.e., the writable state).

In one embodiment, in the second state, the shared memory 11 may be configured to be in a state in which previously stored sensing data may be read from the shared memory 11. Therefore, in one embodiment, the second state is also referred to as a readable state. In one embodiment, the sensing data generated by the sensor 12 may be read from the shared memory 11 only in the second state (i.e., the readable state). In one embodiment, by controlling the operation state of the shared memory 11, the same sensing data may be prevented from being read and written at the same time, thereby causing an error message.

In one embodiment, during the process of activating the shared memory 11, the processor 13 may configure a flag area and a data area in the shared memory 11. The flag area is used for storing flag information. The flag information may reflect the operation state of the shared memory 11. For example, when the flag information in the flag area has a first value, it means that the shared memory 11 is currently in the first state. When the flag information in the flag area has a second value, it means that the shared memory 11 is currently in the second state. The first value is different from the second value. In addition, the data area is used for storing the sensing data generated by the sensor 12.

In one embodiment, the processor 13 may modify the flag information through one of the sensor interface 101 and the software interface 102 to adjust the access authority of the data area. By adjusting the access authority of the data area, the access to the shared memory 11 by the sensor interface 101 and the software interface 102 may be controlled.

Figure 2:
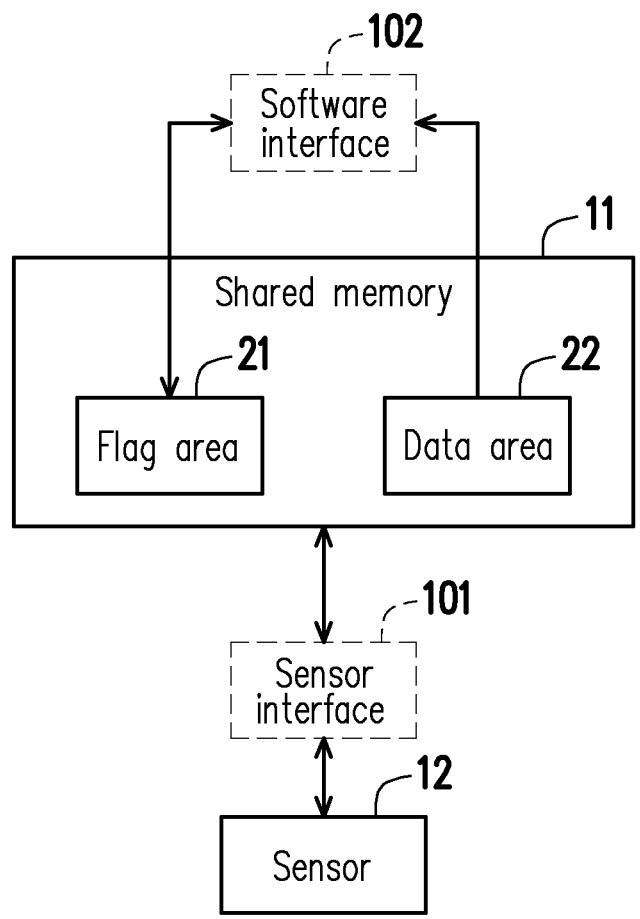
FIG. 2 is a schematic diagram of accessing a shared memory according to an embodiment of the disclosure.

Referring to FIG. 1 and FIG. 2, the processor 13 may configure a flag area 21 and a data area 22 in the shared memory 11. When the processor 13 detects that the flag information in the flag area 21 has the first value through the sensor interface 101, it means that the shared memory 11 is currently in the first state. In response to the shared memory 11 being in the first state (or the flag information in the flag area 21 has the first value), the processor 13 may store the first sensing data generated by the sensor 12 in the data area 22 through the sensor interface 101. After the first sensing data is completely stored in the data area 22, the processor 13 may modify the flag information in the flag area 21 to have the second value, to switch the operation state of the shared memory 11 to the second state.

When the processor 13 detects that the flag information in the flag area 21 has the second value through the software interface 102, it means that the shared memory 11 is currently in the second state. In response to the shared memory 11 being in the second state (or the flag information in the flag area 21 has the second value), the processor 13 may read the first sensing data from the data area 22 through the software interface 102. After the first sensing data is completely read from the data area 22, the processor 13 may modify the flag information in the flag area 21 to have the first value through the software interface 102, to restore the operation state of the shared memory 11 to the first state. After restoring the operation state of the shared memory 11 to the first state, in response to the shared memory 11 being in the first state (or the flag information in the flag area 21 has the first value), the processor 13 may store the second sensing data generated by the sensor 12 in the data area 22 through the sensor interface 101. After the second sensing data is completely stored in the data area 22, the processor 13 may modify the flag information in the flag area 21 to have the second value, so as to prompt the software interface 102 to read the second sensing data from the data area 22.

In one embodiment, new sensing information is allowed to be written into the data area 22 only when the flag information in the flag area 21 has the first value. In one embodiment, the sensing information in the data area 22 is allowed to be read only when the flag information in the flag area 21 has the second value.

In one embodiment, the sensing information in the data area 22 is prohibited from being read when the flag information in the flag area 21 has the first value. In one embodiment, new sensing information is prohibited from being written into the data area 22 when the flag information in the flag area 21 has the second value.

In one embodiment, by switching the operation state of the shared memory 11 between the first state and the second state, the sensing data generated by the sensor 12 may be stored in the shared memory 11 or read from the shared memory 11 at an appropriate time point (or time range). For example, the sensing data (e.g., the first sensing data) read from the shared memory 11 may be used for performing a default operation.

In one embodiment, the processor 13 may obtain the movement information of the electronic device configured with the sensor 12 in the physical space according to the first sensing data. For example, the movement information may reflect a tilting state (e.g., tilting at a specific angle) and/or a moving state (e.g., moving a specific distance in a specific direction) of the electronic device. It should be noted that, depending on the type of the sensor 12, the processor 13 may perform different default operations according to the sensing information generated by the sensor 12, which is not limited in the disclosure.

In one embodiment, the processor 13 may detect the type of the sensor 12. The processor 13 may set a specific sensor interface as the sensor interface 101 used for communicating with the sensor 12 according to the type of the sensor 12. For example, in response to the type of the sensor 12 being a certain type (also referred to as the first type), the processor 13 may set a certain sensor interface (also referred to as the first sensor interface) as the sensor interface 101. Alternatively, in response to the type of the sensor 12 being another type (also referred to as the second type), the processor 13 may set another sensor interface (also referred to as the second sensor interface) as the sensor interface 101. The specification of the first sensor interface is different from the specification of the second sensor interface. For example, the first sensor interface includes an application programming interface suitable for communicating with the first type of sensor, and the second sensor interface includes an application programming interface suitable for communicating with the second type of sensor.

Figure 3:
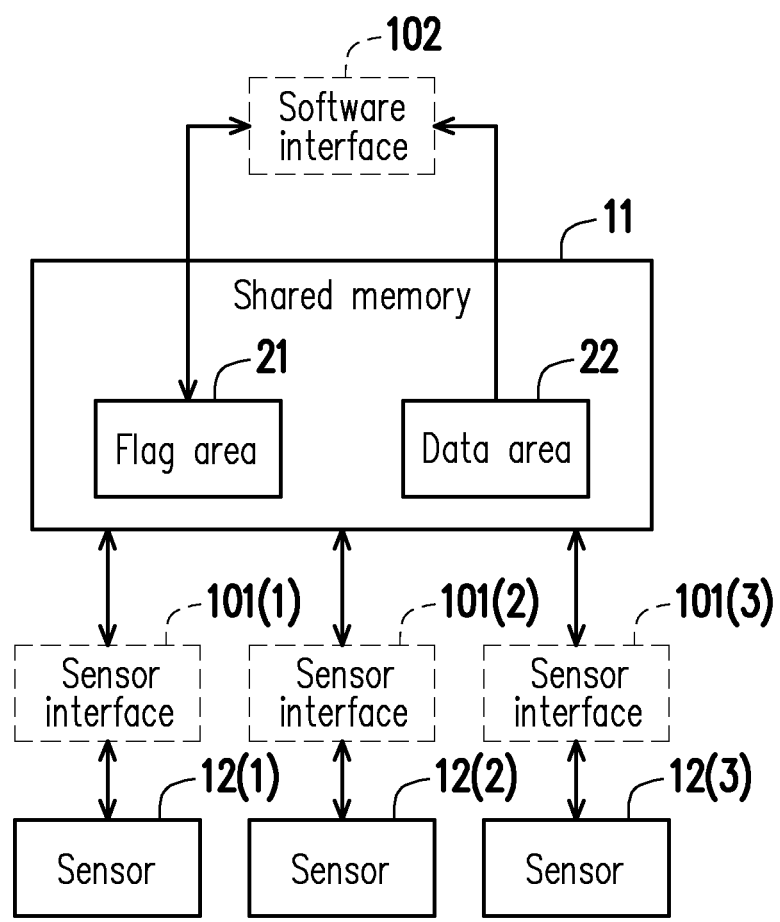
FIG. 3 is a schematic diagram of accessing a shared memory according to an embodiment of the disclosure.

Referring to FIG. 1 and FIG. 3, in one embodiment, the sensor 12 may include at least one of the sensors 12(1) to 12(3), and the sensor interface 101 may include at least one of the sensor interfaces 101(1) to 101(3). The processor 13 may select suitable sensor interfaces 101(1) to 101(3) according to the types of the sensors 12(1) to 12(3) (e.g., the manufacturer and/or the device model) to respectively communicate with the sensors 12(1) to 12(3). Regardless of the type of the sensor interfaces 101(1) to 101(3) adopted, the software interface 102 may be used universally without redesigning.

It should be noted that, the embodiment of FIG. 2 may be used for describing the operation details in which the sensor 12(*i*) and the sensor interface 101(*i*) are configured at the same time, and are not repeated herein. In addition, multiple shared memories 11 may be used in conjunction with multiple sets of sensors 12(*i*) and sensor interfaces 101(*i*).

In step S402, sensing data is generated by the sensor. In step S403, the first sensing data among the sensing data is stored in the shared memory through the sensor interface and the operation state of the shared memory is updated. In step S404, in response to the update of the operation state, the first sensing data is read from the shared memory through a software interface. In step S405, a default operation is performed according to the first sensing data.

Figure 4:
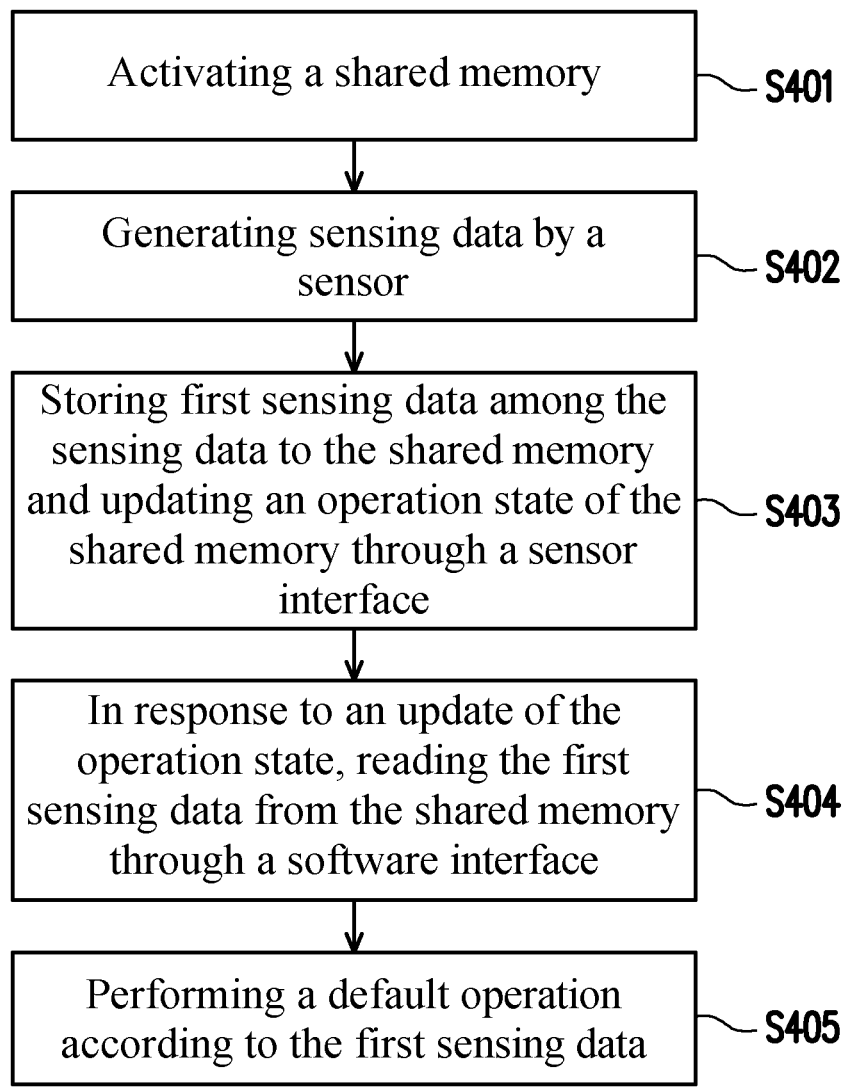
FIG. 4 is a flowchart of a sensing data accessing method according to an embodiment of the disclosure.

However, each step in FIG. 4 has been described in detail as above, and are not repeated herein. It should be noted that each of the steps in FIG. 4 may be implemented as multiple program codes or circuits, and the disclosure is not limited thereto. In addition, the method in FIG. 4 may be used in conjunction with the above-mentioned exemplary embodiments, or may be used alone, and the disclosure is not limited thereto.

To sum up, through the coordinated operation of a customized sensor interface, a unified software interface, and the shared memory, the product development efficiency and/or product stability of the electronic device configured with various sensors may be effectively improved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A sensing data accessing method, comprising:
   activating a shared memory;
   generating sensing data by a sensor;
   storing a first sensing data among the sensing data to the shared memory and updating an operation state of the shared memory through a sensor interface; and
   in response to an update of the operation state, reading the first sensing data from the shared memory through a software interface,
   wherein storing the first sensing data to the shared memory and updating the operation state of the shared memory through the sensor interface comprises:
   detecting the operation state of the shared memory through the sensor interface;
   in response to the operation state of the shared memory being a first state, storing the first sensing data in the shared memory through the sensor interface; and
   after storing the first sensing data in the shared memory, updating the operation state of the shared memory to a second state through the sensor interface to allow the software interface to read the first sensing data from the shared memory.

2. The sensing data accessing method according to claim 1, wherein in response to the update of the operation state, reading the first sensing data from the shared memory through the software interface comprises:
   detecting the operation state of the shared memory through the software interface;
   in response to the operation state of the shared memory being the second state, reading the first sensing data from the shared memory through the software interface; and
   after reading the first sensing data from the shared memory, restoring the operation state of the shared memory to the first state through the software interface to allow the sensor interface to store a second sensing data among the sensing data in the shared memory.

3. The sensing data accessing method according to claim 1, wherein activating the shared memory comprises:
   configuring a flag area and a data area in the shared memory, wherein the flag area is used for storing flag information, the flag information reflects the operation state of the shared memory, and the data area is used for storing the sensing data.

4. The sensing data accessing method according to claim 3, further comprising:

modifying the flag information through the sensor interface or the software interface to adjust an access authority of the data area.

5. The sensing data accessing method according to claim 1, further comprising:
   detecting a type of the sensor;
   if the detected type of the sensor is a first type, setting a first sensor interface as the sensor interface used for communicating with the sensor, and
   if the detected type of the sensor is a second type, setting a second sensor interface as the sensor interface, wherein a specification of the first sensor interface is different from a specification of the second sensor interface, the first sensor interface includes an application programming interface suitable for communicating with the sensor with the first type, and the second sensor interface includes an application programming interface suitable for communicating with a sensor with the second type.

6. The sensing data accessing method according to claim 1, further comprising:
   obtaining movement information of an electronic device configured with the sensor in a physical space according to the first sensing data.

7. A sensing data accessing system, comprising:
   a shared memory;
   a sensor, used for generating sensing data;
   a processor, coupled to the shared memory and the sensor, wherein the processor is used for:
   activating the shared memory;
   storing a first sensing data among the sensing data to the shared memory and updating an operation state of the shared memory through a sensor interface; and
   in response to an update of the operation state, reading the first sensing data from the shared memory through a software interface,
   wherein storing the first sensing data among the sensing data to the shared memory and updating the operation state of the shared memory through the sensor interface comprises:
   detecting the operation state of the shared memory through the sensor interface;
   in response to the operation state of the shared memory being a first state, storing the first sensing data in the shared memory through the sensor interface; and
   after storing the first sensing data in the shared memory, updating the operation state of the shared memory to a second state through the sensor interface to allow the software interface to read the first sensing data from the shared memory.

8. The sensing data accessing system according to claim 7, wherein in response to the update of the operation state, reading the first sensing data from the shared memory through the software interface comprises:
   detecting the operation state of the shared memory through the software interface;
   in response to the operation state of the shared memory being the second state, reading the first sensing data from the shared memory through the software interface; and
   after reading the first sensing data from the shared memory, restoring the operation state of the shared memory to the first state through the software interface to allow the sensor interface to store a second sensing data among the sensing data in the shared memory.

9. The sensing data accessing system according to claim 7, wherein activating the shared memory comprises:
   configuring a flag area and a data area in the shared memory, wherein the flag area is used for storing flag information, the flag information reflects the operation state of the shared memory, and the data area is used for storing the sensing data.

10. The sensing data accessing system according to claim 9, wherein the processor is further used for:
    modifying the flag information through the sensor interface or the software interface to adjust an access authority of the data area.

11. The sensing data accessing system according to claim 7, wherein the processor is further used for:
    detecting a type of the sensor;
    if the detected type of the sensor is a first type, setting a first sensor interface as the sensor interface used for communicating with the sensor, and
    if the detected type of the sensor is a second type, setting a second sensor interface as the sensor interface, wherein a specification of the first sensor interface is different from a specification of the second sensor interface.

12. The sensing data accessing system according to claim 7, wherein the processor is used for:
    obtaining movement information of an electronic device configured with the sensor in a physical space according to the first sensing data.

* * * * *